(12) United States Patent
Anzalone et al.

(10) Patent No.: US 11,842,445 B1
(45) Date of Patent: Dec. 12, 2023

(54) DIGITAL REPRESENTATION OF TRANSFER OF MONETARY ASSETS

(71) Applicant: Wells Fargo Bank, N.A., San Francisco, CA (US)

(72) Inventors: Marjorie Summit Anzalone, San Francisco, CA (US); Andriy Fedorchuk, San Francisco, CA (US); Jason Huang, San Francisco, CA (US); Graham Linn, San Francisco, CA (US); Dennis E. Montenegro, Concord, CA (US); Matthew Pearce, Pacifica, CA (US); Ramanathan Ramanathan, Bellevue, WA (US); Debarchana Roy, San Francisco, CA (US); Adam Smith-Kipnis, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 370 days.

(21) Appl. No.: 17/083,029

(22) Filed: Oct. 28, 2020

(51) Int. Cl.
| | |
|---|---|
| *G06T 19/00* | (2011.01) |
| *G06Q 40/02* | (2023.01) |
| *G06Q 20/36* | (2012.01) |
| *H04L 9/00* | (2022.01) |

(52) U.S. Cl.
CPC ......... *G06T 19/003* (2013.01); *G06Q 20/363* (2013.01); *G06Q 40/02* (2013.01); *H04L 9/50* (2022.05)

(58) Field of Classification Search
CPC ............ H04L 27/2673; H04L 27/2607; H04L 27/265; H04L 5/0007; H04W 4/46; H04W 4/70; H04W 24/10; H04W 72/0446; H04W 8/005
See application file for complete search history.

(56) References Cited

U.S. PATENT DOCUMENTS

| | | | |
|---|---|---|---|
| 10,303,118 B2 | 5/2019 | Kline et al. | |
| 10,504,257 B1 | 12/2019 | Schutzman et al. | |
| 10,528,993 B2 | 1/2020 | Hoang et al. | |
| 10,708,042 B1* | 7/2020 | Rubenstein | H04L 9/0643 |
| 2004/0148251 A1* | 7/2004 | Kavoun | G07F 17/0014 |
| | | | 705/39 |
| 2014/0365363 A1* | 12/2014 | Knudsen | G06Q 20/3674 |
| | | | 705/41 |
| 2016/0125540 A1* | 5/2016 | Oakley | G06F 40/211 |
| | | | 705/36 R |
| 2016/0162873 A1* | 6/2016 | Zhou | G06F 3/002 |
| | | | 705/65 |
| 2016/0223986 A1 | 8/2016 | Archambeau et al. | |
| 2016/0267577 A1 | 9/2016 | Crowder et al. | |
| 2018/0323972 A1 | 11/2018 | Reed et al. | |
| 2018/0357620 A1* | 12/2018 | Gjondrekaj | G06Q 20/227 |
| 2018/0374143 A1 | 12/2018 | Williamson et al. | |
| 2020/0302517 A1* | 9/2020 | Van Os | G06F 11/324 |

* cited by examiner

*Primary Examiner* — Yingchun He
(74) *Attorney, Agent, or Firm* — Merchant & Gould P.C.

(57) ABSTRACT

A method for representing a visualization of assets includes receiving a request for a transfer of assets from an electronic computing device having augmented reality (AR) capabilities or virtual reality (VR) capabilities. The request includes a source account, a destination account, and a transfer amount. An image data is generated, which is representative of the transfer amount being transferred from the source account to the destination account. The image data is sent to an image generator of the electronic computing device to be displayed.

17 Claims, 9 Drawing Sheets

DIGITAL REPRESENTATION OF TRANSFER OF MONETARY ASSETS

BACKGROUND

It can be difficult to understand when funds actually transfer for a transaction that is fully electronic. For instance, in a digital transaction, there is no physical exchange of money. Visualizing the transaction and how much money remains in an account before and after a transaction can therefore be challenging.

SUMMARY

Embodiments of the disclosure are directed to generating a digital representation that enables a user to visualize an asset transfer and/or account balance.

In a first embodiment, a method for representing a visualization of assets includes receiving a request for a transfer of assets from an electronic computing device having augmented reality (AR) capabilities or virtual reality (VR) capabilities. The request includes a source account, a destination account, and a transfer amount. An image data is generated, which is representative of the transfer amount being transferred from the source account to the destination account. The image data is sent to an image generator of the electronic computing device to be displayed.

In another embodiment, an electronic computing device comprises at least one processor and a system memory. The system memory includes instructions, which, when executed by the processor, causes the electronic computing device to perform the following steps. A request for a transfer of assets is received from an electronic computing device having augmented reality (AR) capabilities or virtual reality (VR) capabilities, the request includes a source account, a destination account, and a transfer amount. An image data representative of the transfer amount being transferred from the source account to the destination account is generated. The image data is sent to an image generator of the electronic computing device to be displayed.

In yet another embodiment, a method for visualizing a transfer of assets on an electronic computing device having augmented reality (AR) capabilities or virtual reality (VR) capabilities includes the following. A request for a transfer of assets from an electronic computing device is received. The request includes a source account, a destination account, and a transfer amount. The request is sent to a server computing device. An image data representative of the transfer amount is received from the server computing device. The image data depicting the transfer amount from the electronic computing device to a second electronic computing device associated with the destination account is displayed on an image generator of the electronic computing device.

The details of one or more techniques are set forth in the accompanying drawings and the description below. Other features, objects, and advantages of these techniques will be apparent from the description, drawings, and claims.

DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
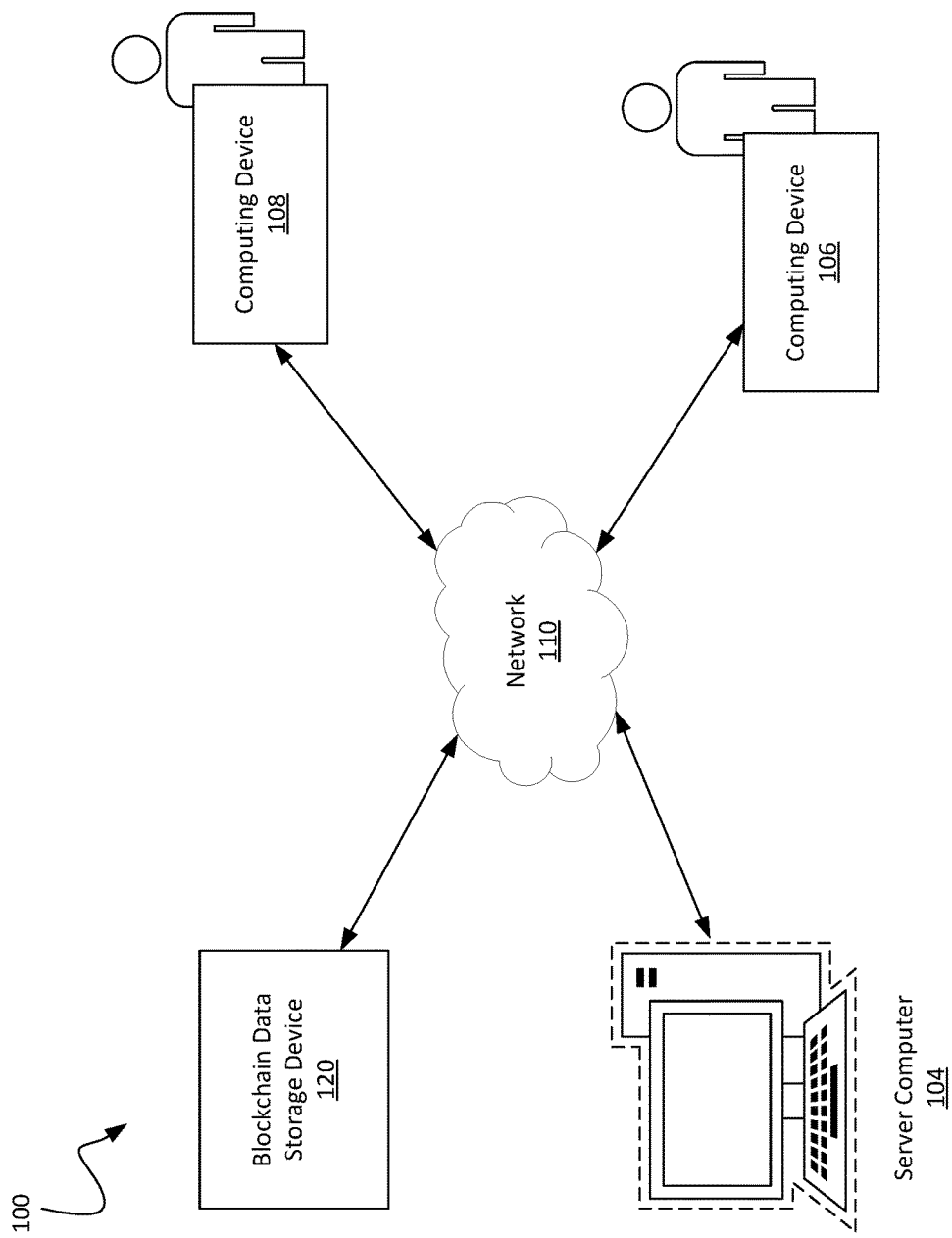
FIG. 1 illustrates an environment that supports the use of an electronic computing device in generating a holographic image.

Various embodiments will be described in detail with reference to the drawings, wherein like reference numerals represent like parts and assemblies through the several views. Reference to various embodiments does not limit the scope of the claims attached hereto. Additionally, any examples set forth in this specification are not intended to be limiting and merely set forth the many possible embodiments for the appended claims.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. The use of "comprise," "comprises," "comprising," "include," "includes," and "including" are interchangeable and not intended to be limiting. The term "such as" also is not intended to be limiting. For example, the term "including" shall mean "including, but not limited to."

The present disclosure is directed towards representing a visualization of assets. Generally, a request for a transfer is received from an electronic computing device. The request includes, at least, a source account, a destination account, and a transfer amount. An image representative of the transfer amount being transferred from the source account to the destination account is generated, and is sent to an image generator of the electronic computing device where it is displayed.

In an example embodiment, the image is a two-dimensional or three-dimensional image (e.g., a holographic image) that enables a user to visualize the asset transfer. In an example, a monetary amount is visualized by a user as a holographic image transferring from the user to a destination. In a further embodiment, the holographic image includes additional information, such as a reminder for a future transfer, an account balance, an earmarked amount, or other related and/or pertinent information.

In yet another embodiment, a non-monetary amount is visualized by a user as a holographic image transferring from the user to a destination. A non-monetary asset may be anything that holds a value, such as inventory, equipment, property, and intangible property. For example, a user may be able to visualize inventory associated with a business, or returning a book to a library.

While a holographic image is used to describe the examples set forth below, any type of image may be used to visualize the transfer. Other images include images generated on a computing screen, and other ways of providing a visualization to a user. Further, while a wearable electronic computing device is used throughout the examples described, any type of computing device usable by a user is contemplated.

FIG. 1 illustrates an example environment 100 that supports the use of a wearable device in generating a holographic image of a transfer of assets. The system 100 includes a first electronic computing device 106, a second electronic computing device 108, a server computer 104, a blockchain data storage device 120, and a network 110. In an example, the example server computer 104 is an electronic computing device of a financial institution, such as a bank. The server computer 104 houses and controls the banking aspects of the system described herein. For example, the server computer 104 receives a request for a transfer of assets via the network 110 and processes the request. The request can be from one of the first electronic computing device 106 or second electronic computing device 108. The server computer 104 can process the request by, for example, transferring an asset amount from a first account to a second account.

After the server computer 104 processes the request, a notification can be sent to the blockchain data storage device 120 via the network 110, where the transaction is memorialized. A notification of the transaction can also be sent via the network 110 to one of the first electronic computing device 106 or second electronic computing device 108, where a user can be notified of the completed transaction.

The first electronic computing device 106 and/or the second electronic computing device 108 may include a wearable device comprising augmented reality (AR) or virtual reality (VR) capabilities. An AR device can be a stand-alone device or an electronic computing device such as a smartphone or tablet computer that includes an augmented reality software application. The stand-alone AR device can comprise a headset, similar to eyeglasses, which may be worn by the user. One example of an AR headset is Google Glass®, from Google Inc. of Mountain View, CA. Another example of an AR headset is Microsoft HoloLens®, from Microsoft Corporation of Redmond, WA. More than one AR device can be used.

The headset can include a wearable computer, a camera, and an optical display. The wearable computing device includes a wireless telecommunication capability, permitting a wireless connection between the wearable computing device and one or more server computers. The wearable computer also includes voice recognition capability, permitting the user to direct the wearable computer via voice commands. In addition, in some implementations, the wearable computer also includes biometric capability such as facial recognition, retinal scan capability, finger print, and voice print capability.

An example VR device is an electronic computing device that supports virtual reality. Virtual reality is a computer technology that uses images, sounds, and other sensations to replicate a real environment or an imaginary setting, and simulates a user's physical presence in this environment to enable the user to interact with the replicated environment. The VR device can comprise a head-mounted display, such as goggles with an eye-viewable screen, that can provide a view of the replicated environment and that can permit interaction with the replicated environment. An example VR device is Oculus Rift®, from Oculus VR, LLC of Irvine, CA. More than one VR device can be used.

The example network 110 is a computer network and can be any type of wireless network, wired network, and cellular network, including the Internet. The first electronic computing device 106 and/or the second electronic computing device 108 can communicate with the server computer 104 and/or the blockchain data storage device 120 via the network 110.

In an example embodiment, the image can be created in virtual space using a virtual reality (VR) electronic computing device (VR device) or an augmented reality (AR) electronic computing device (AR device). The VR device can comprise a physical device that can create a virtual reality environment for the user. The AR device can comprise a physical device that can project virtual images over a real image viewed through the AR device. In this disclosure, the VR device and the AR device are also referred to as visual computing devices or a wearable electronic computing device.

A visualization of the image of the digital monetary (or non-monetary) amount can be enhanced using text characters, color, shading, and other enhancements. As discussed in more detail later herein, the text characters, color, shading, and other enhancements can be made available from a pallet of available text characters, colors, and shadings available on the VR device and on the AR device.

In a first example, a green color may be used to signify receiving an asset and a red color may be used to signify sending an asset. Further, the brightness of the color can be used to signify the amount, such as using a brighter color for a larger amount and a darker color for a lesser amount.

In another example, text may be used to provide additional information regarding the image. Text may be used to provide an image of the source account, the destination account, the amount, or a combination thereof. Further, text may be used to provide additional information, as is described below at FIG. 5.

In yet another example, the size of the image may be used to signify an amount. A larger image may be used to signify a larger asset amount being transferred or a larger amount held in an account. A smaller image may be used to signify a smaller asset amount being transferred or a smaller amount held in an account.

The systems and methods are generally described for an AR device that may be worn or carried by a user. An example of an AR device that may be worn by the user is an AR headset. An example of an AR device that may be carried by the user is a smart telephone or tablet computer that includes AR components such as a processor, display and camera, and an AR software application.

A blockchain data storage device 120 can be an electronic computing device or a plurality of electronic computing devices. The blockchain data storage device 120 can comprise a plurality of distributed, peer-to-peer storage devices, for example server computing devices, that can store the transaction data. The example blockchain data storage device 120 is a digital ledger that stores transactional data. The blockchain data storage device 120 can receive blockchain entries, or blocks, and store the associated data. The blockchain storage device 120 can determine whether to store the data in a new block. There are examples described below and the blockchain can include hundreds or thousands of entries associated with transactions.

Figure 2:
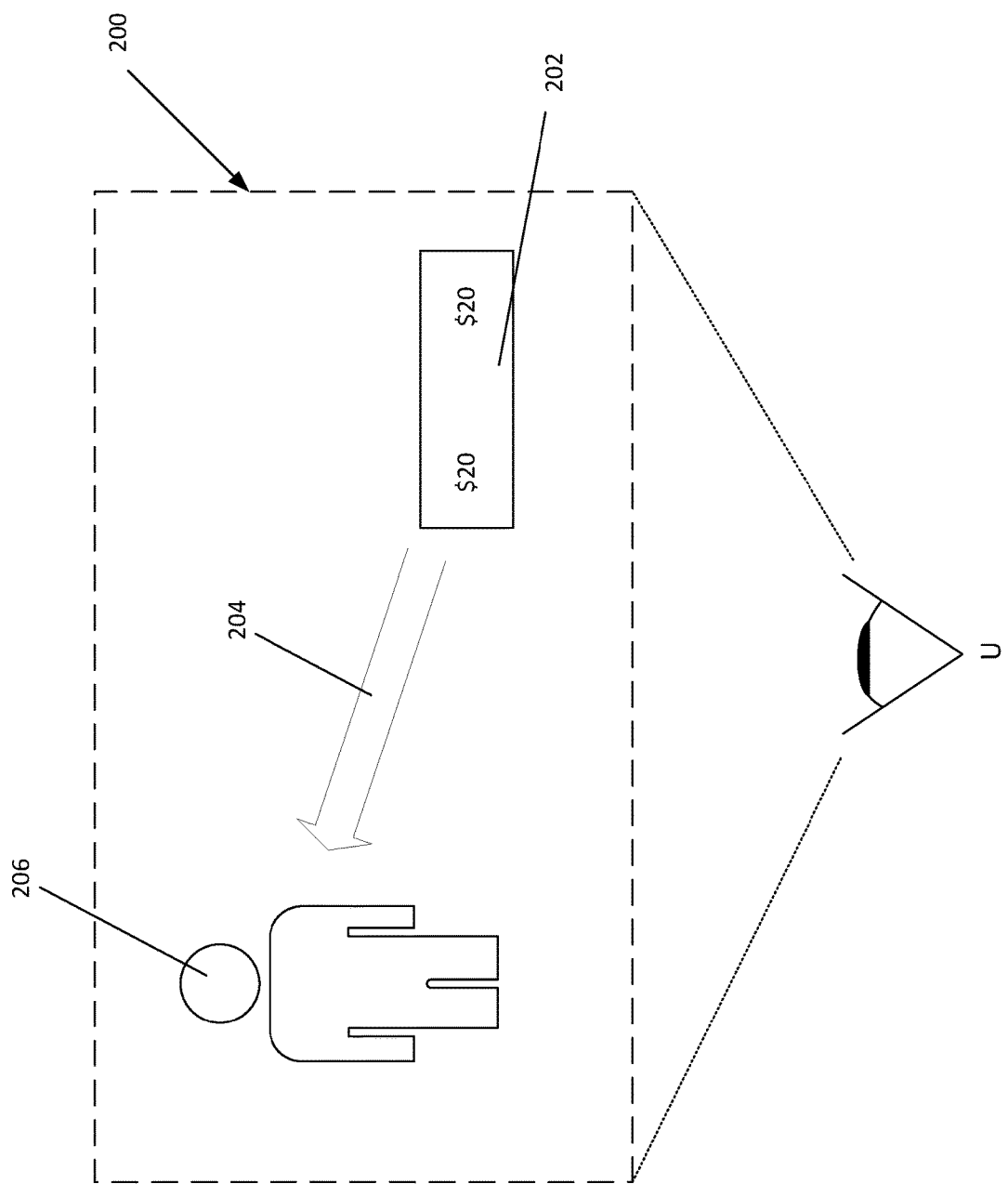
FIG. 2 illustrates an example holographic image of an asset transfer.

FIG. 2 illustrates an example holographic image 200 of an asset transfer. The holographic image 200 can be depicted, for instance, by the first electronic computing device 106 to the user based upon transactional information provided by the server computer 104 and/or the blockchain data storage device 120. The information shown in the holographic image 200 may also be shown as an image on a computing screen. In the embodiment shown, the user U can visualize a transfer amount 202 being transferred 204 to a recipient 206 (also referred to as a "destination account" or "destination"). In the example as shown, the transfer amount 202 is a monetary amount. However, in alternative embodiments, the transfer amount 202 may be a non-monetary asset, such as inventory, or other items that hold value.

In the holographic image 200, the transfer amount 202 is being transferred to a recipient 206; however, other holographic visualizations are possible. The user U may visualize a transfer amount 202 being transferred to themselves from a third party source account. For example, a user U may receive a transfer amount 202 oweable from a friend. Still further, the user U may visualize a transfer amount 202 being transferred from a first account to a second account, and neither of the accounts is the user's account. For example, the user U may visualize a transfer of assets within a business, from one business unit to another business unit.

Figure 3B:
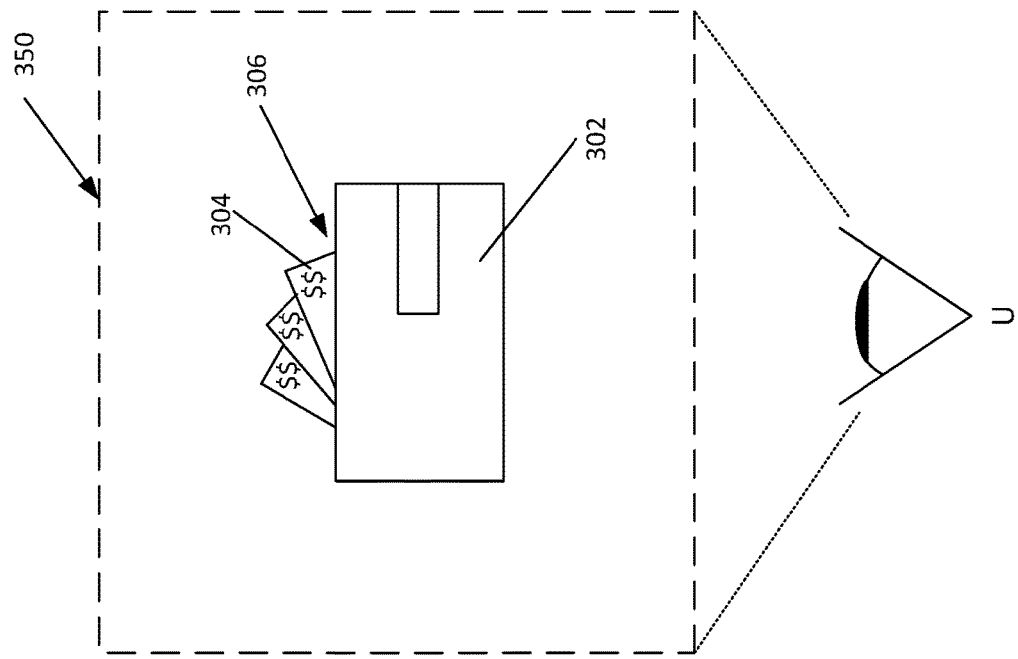
FIGS. 3A-3B illustrates example holographic images of an account balances.
Figure 3A:
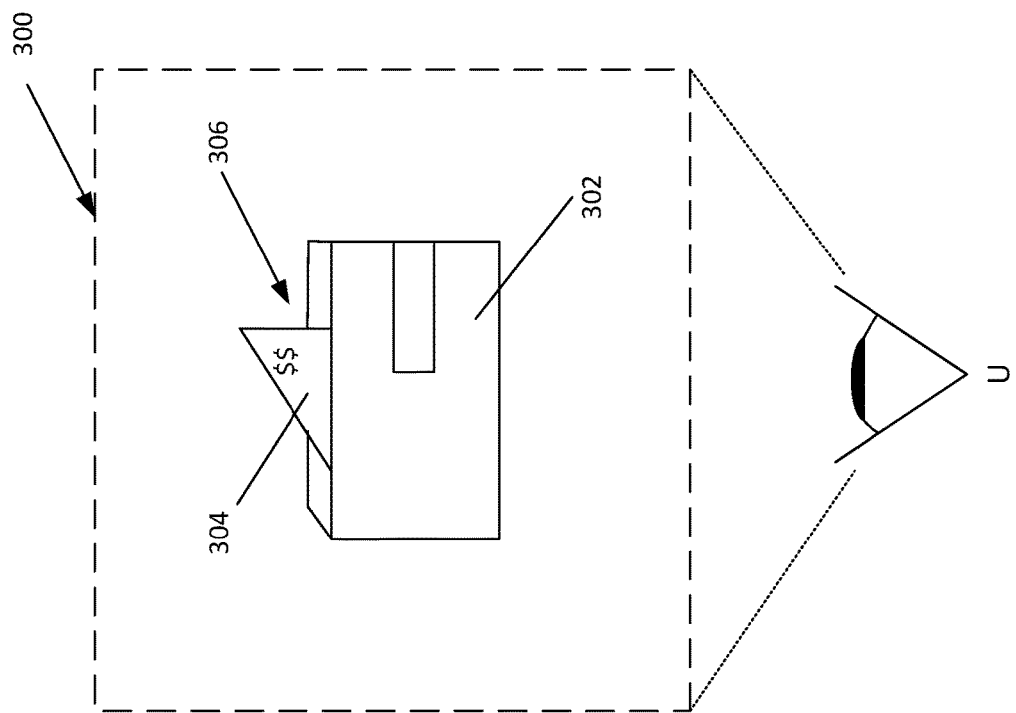

FIG. 3A illustrates another example holographic image 300. In the example shown, a holographic image 300 of an account balance 306 is visualized. The account balance 306 is visualized as a wallet 302 containing a sum of money 304. In the example shown, the holographic image 300 allows a user to visualize how much money they have in their account(s). A single wallet 302 may show a total amount of money 304 that a user has across a plurality of accounts. In another embodiment where the user has multiple accounts, multiple wallets 302 may be shown, each with an appropriate sum of money 304.

In an embodiment where the assets are not money, a different image may be used to visualize the sum of assets. For example, inventory may be visualized as a set of boxes, or the inventory item itself. Still further, different colors, sizes, and shapes may represent different types of inventory or differing amounts of inventory.

FIG. 3B illustrates an alternative example holographic image 350 of an account balance 306. The account balance 306 is visualized as a wallet 302 containing a sum of money 304. The sum of money 304 in the holographic image 350 is greater than the sum of money 304 in the holographic image 300, which is indicated by the number of bills shown.

As described above, the account balance 306 can be displayed differently depending on the amount of assets or the type of assets. For example, more than one wallet 302 may be displayed. Different colors, sizes, and shapes may represent different types of assets or differing amounts of assets.

Still further, the wallet 302 may be incorporated into a holographic image representing a transfer 204 of assets, as shown in FIG. 2. A transfer 204 of assets, for example, a monetary amount, may be shown as transferring from a user's wallet 302 to a destination account. When the monetary amount leaves the user's wallet 302, the sum of money 304 is shown to decline. Alternatively, a transfer 204 of a monetary amount may be shown as transferring from a source account or source wallet to a user's wallet 302 (the "destination account"). When the monetary amount enters the user's wallet 302, the sum of money 304 is shown to increase.

As shown, the balance is displayed as a digital wallet 302. A different amount of assets can be visualized various different ways. For example, the size of the wallet 302 may be bigger if the user has more assets and may be smaller if the user has less assets. Other examples include using a variety of sizes, colors, patterns, orientation, text, or a number of wallets.

Figure 4B:
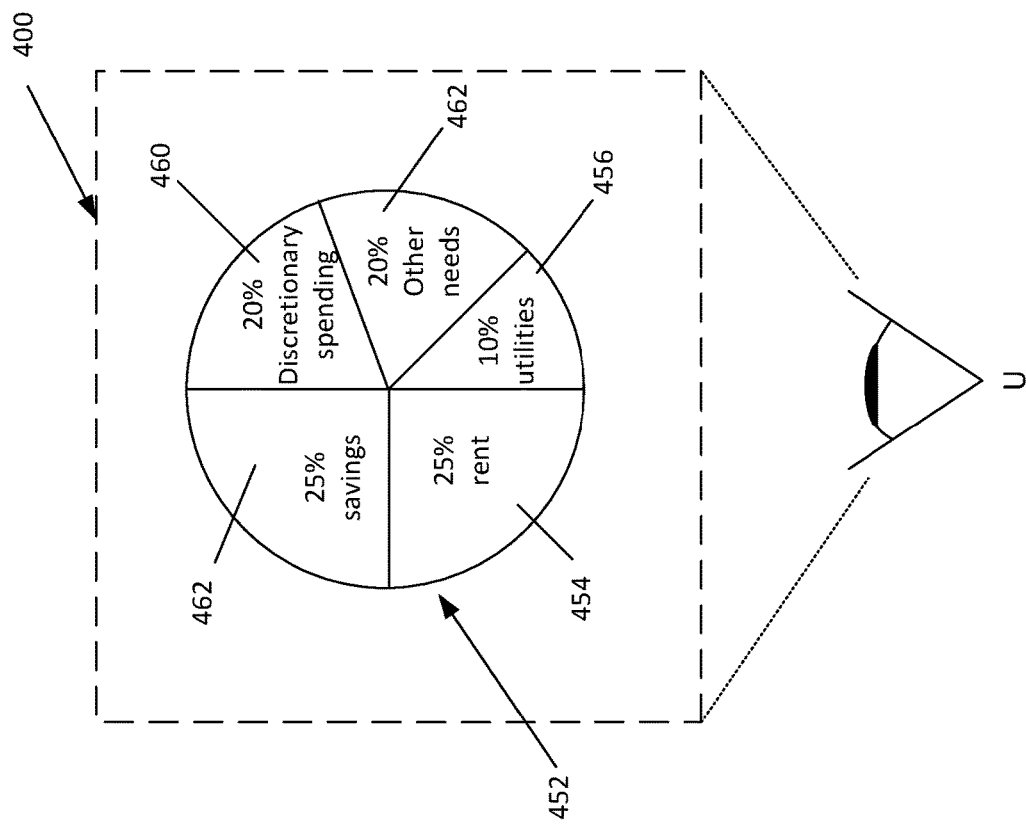
FIGS. 4A-4B illustrate example holographic images of earmarked account balances.
Figure 4A:
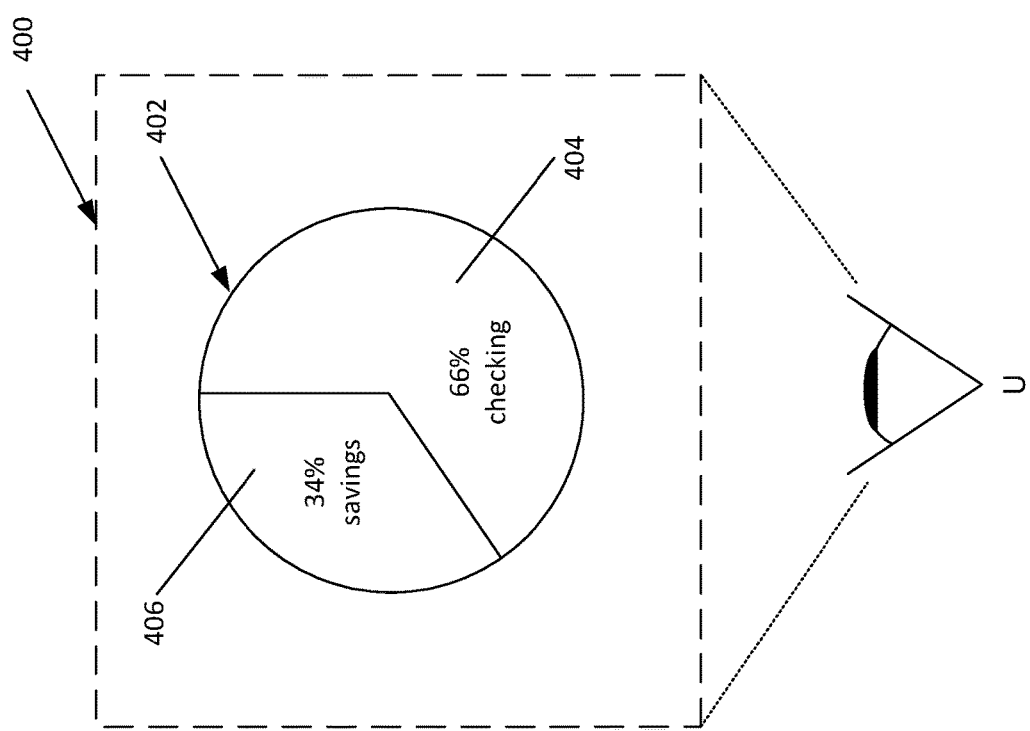

FIG. 4A illustrates an example holographic image 400 of a sum of accounts 402 held by a user. The sum of accounts 402 is shown with a breakdown of its components. The sum of accounts 402 includes a portion attributed to a checking account 404, and a portion attributed to a savings account 406. The sum of accounts 402 is shown as a pie-chart; however, the sum of accounts 402 may be visualized in other embodiments, such as multiple wallets 302, wherein each wallet 302 represents a different account. Still further, the sum of accounts 402 may be displayed with varying sizes, colors, patterns, orientations, and/or texts.

The sum of accounts 402 may represent accounts that the user has at a single financial institution, for example a savings account 406 and a checking account 404 maintained by a bank. The user may also be able to link multiple accounts held at a plurality of different financial institutions, so the holographic image 400 may show all accounts held by the user. For example, the holographic image 400 may include the savings account 406, checking account 404, and other accounts, such as a retirement account including an IRA and/or 401K account, a stock market account(s), a health savings account, a flex spending account, a 529 account, and other accounts held by the user.

In another embodiment, a user can visualize accounts associated with a house, such as a mortgage and a home equity account. In yet another embodiment, a user can visualize the distribution of non-monetary assets, such as inventory held by a business. The inventory may be distributed based on type or which business unit holds the inventory.

FIG. 4B illustrates an example holographic image 450 of an earmarked account balance 452. The components of the earmarked account balance 452 include a portion for rent 454, a portion for utilities 426, a portion for other needs 258, such as food and clothing, a portion for discretionary spending 460, and a portion for savings 462. The earmarked account balance 452 may be a single account or may be a total of all accounts held by the user. Other components may be visualized as needed or requested by the user.

An example holographic image 400, 450 may also be useful in a business setting. For example, an account balance 452 may be earmarked based on the budgets of different departments. Still further, an account balance 452 may be earmarked based on different non-monetary assets, such as inventory. In yet a further embodiment, the account balance 452 may include both monetary and non-monetary assets.

Figure 5:
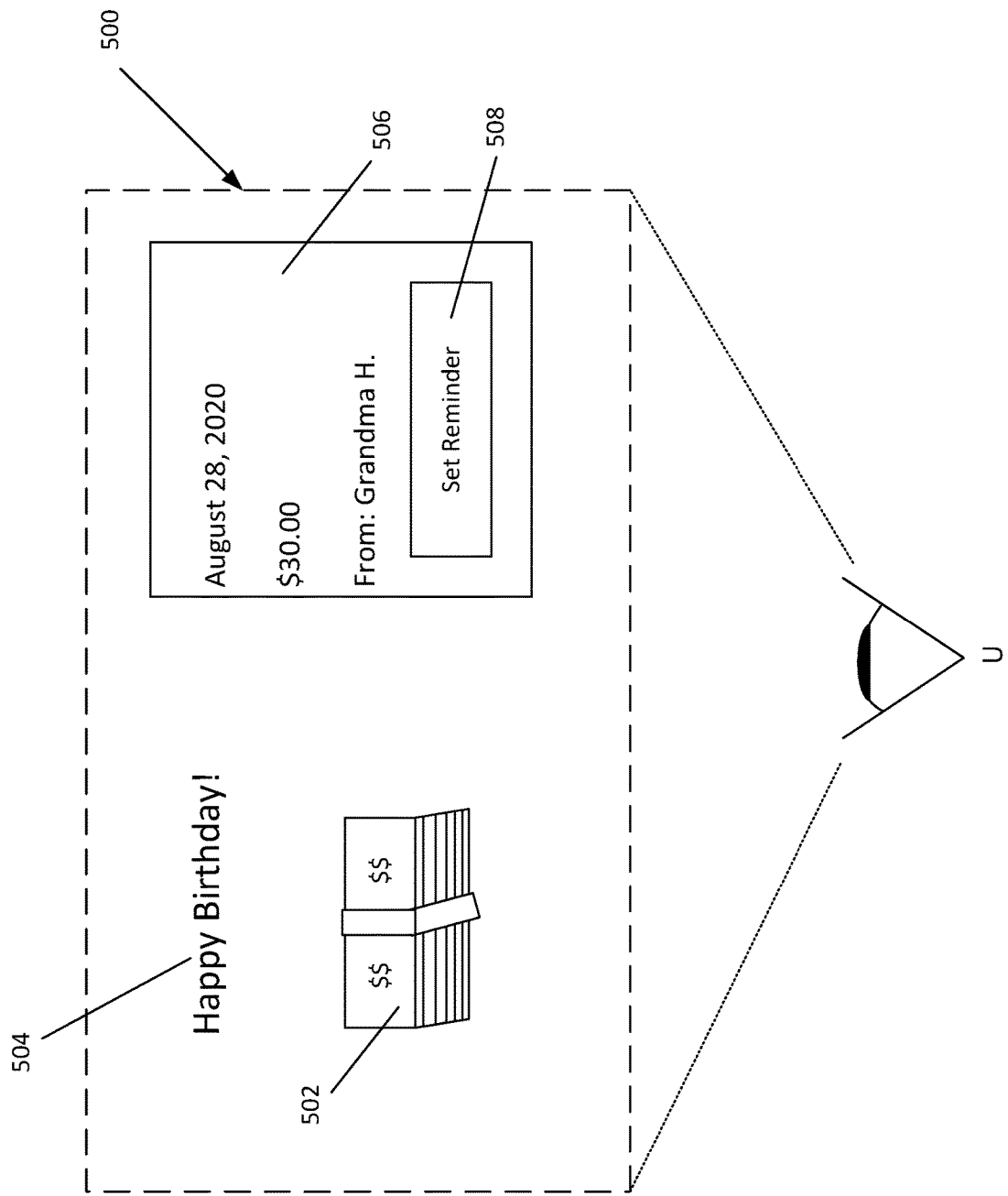
FIG. 5 illustrates another example holographic image of an annotated asset transfer.

FIG. 5 illustrates another example holographic image 500. A sum of money 502 is shown with a text message 504. A user is able to discern additional information 506 associated with the sum of money 502. The additional information 506 includes a date received, an amount, and who the money was from (the "sender"). The additional information 506 also includes the ability to set a reminder 508.

A reminder 508 may be set to send a thank you to the sender and/or what the money was spent on. In an example, the sum of money 502 is from "Grandma H" on Aug. 28, 2020. The user can set a reminder 508 to send a thank you note to Grandma H. Further, what the user spent the sum of money 502 on may be tracked, for example via blockchain, so the user can include that information in the thank you. The reminder 508 may be set at a predetermined period of time, such as two weeks, or may be manually set by the user.

Alternative types of reminders 508 are also possible. For example, if a user lends an asset, such as a book, to someone else, a reminder 508 can be set to retrieve the book at a later date. The later date may be automatically generated, such as when the user comes into proximity with the lendee, or after a set amount of time, such as two weeks. Alternatively, the date may be set by the user.

Reminders 508 may be a holographic image comprising text. Reminders 508 may also be set to include an audio reminder. Further, reminders 508 may be sent to a user via text, e-mail, or other similar forms of communication.

The transfer of money may be memorialized in a blockchain ledger managed and stored by the blockchain data storage device 120. For example, an example ledger is provided below. In this example, the blockchain is used to memorialize the transfer of monetary assets.

---

Begin blockchain
User: User A
Beginning Amount: $100.00
Entry: 100000
Date: Aug. 28, 2020
Transferred Amount: $30.00
From: Grandma H
To: User A
Beginning Amount: $100.00
Ending Amount: $130.00
Entry: 100001
Date: Aug. 30, 2020
Transferred Amount: $30.00
From: User A
To: Department Store
Beginning Amount: $130.00
Ending Amount: $100.00
End Blockchain

---

Figure 6:
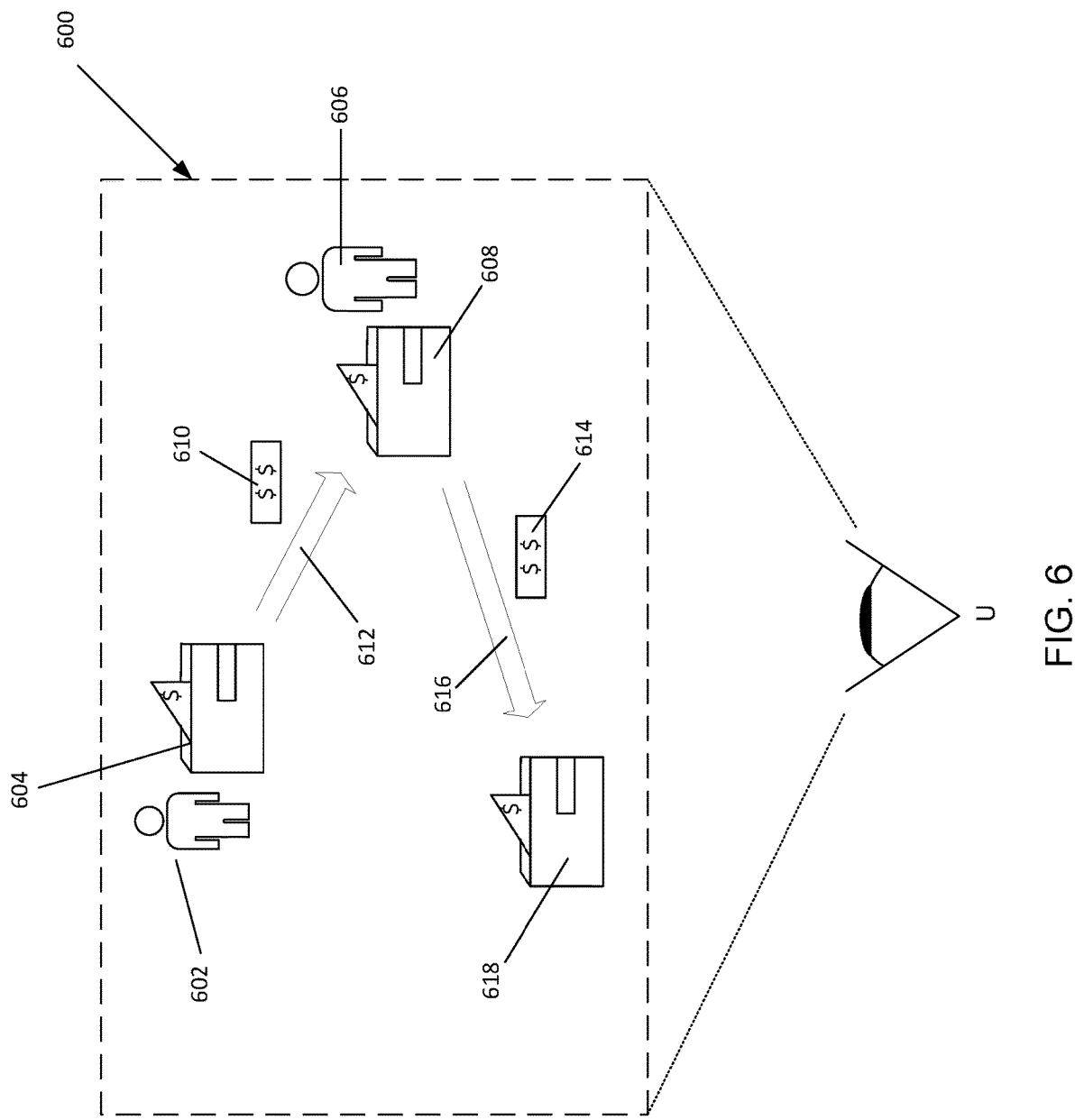
FIG. 6 illustrates an example holographic image of a transfer of money between multiple accounts.

FIG. 6 illustrates an example holographic image 600 of a transfer of money between multiple users. The first user 602 and the associated financial account 604 transfers 612 a sum of money 610 to a second user 606. The second user 606 has an associated financial account 608, where the transfer 612 of money 610 is deposited. The second user 606 transfers 616 a second amount of money 614 to user U. The second amount of money 614 is deposited into the user's U financial account 618.

Such a holographic image 600 may also be used to track money with an organization. For example, a CFO of a business may be able to visualize assets as they are transferred between departments of the business or a transfer of money into and out of the business. Still further, a similar holographic image 600 may be used to visualize movement of non-monetary assets within a business.

Figure 7:
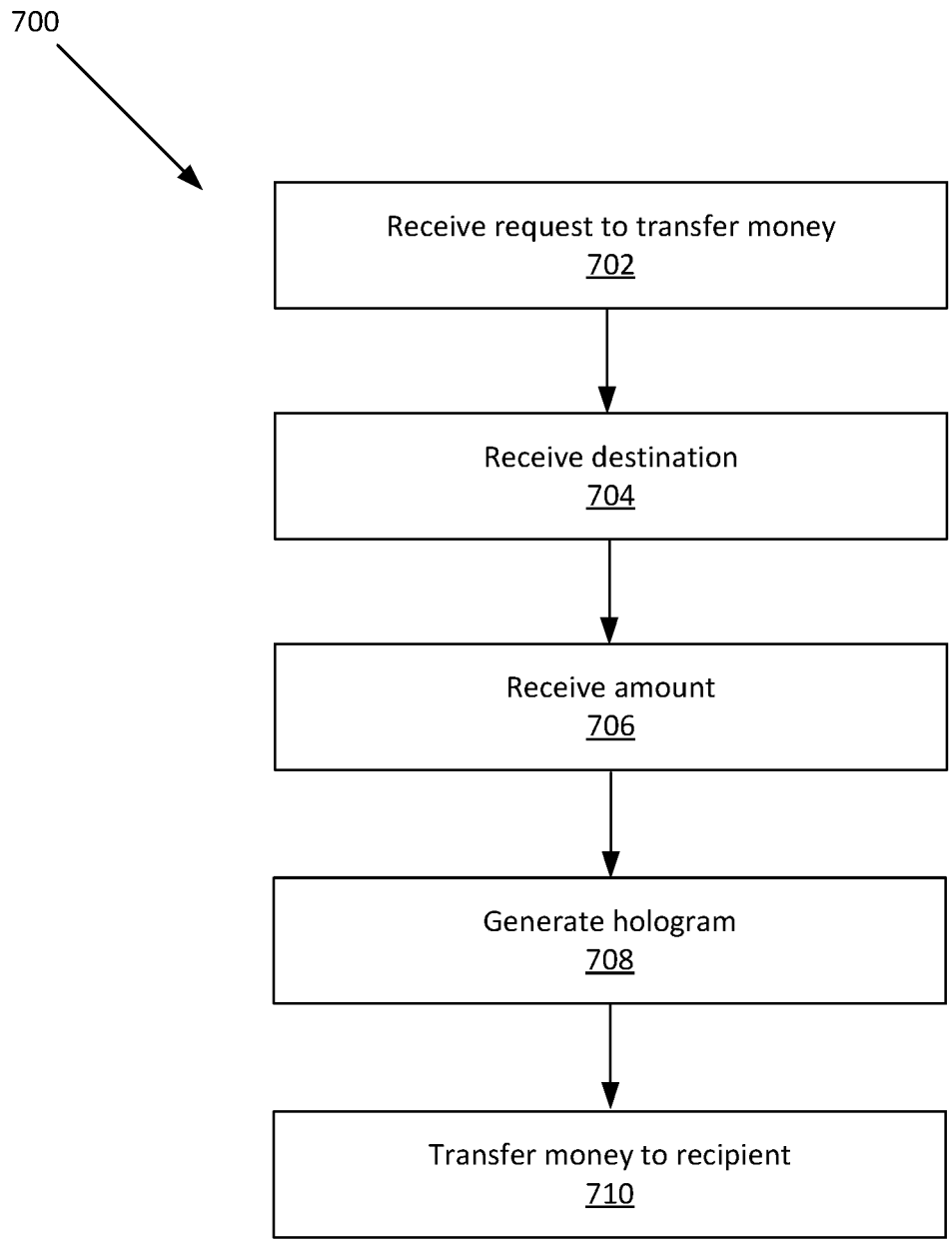
FIG. 7 illustrates an example method of generating and displaying a holographic image.

FIG. 7 illustrates an example method 700 of generating and displaying a holographic image on an electronic computing device, for example a wearable electronic computing device that comprises AR and/or VR capabilities. The method 700 is for an asset transfer from a source account to a destination account.

At step 702, a request to transfer money is received. The request includes the source account information from where the money is to be transferred from.

At step 704, the destination of the asset transfer is received. The destination may be a destination account associated with a destination user, such as an individual or a business.

At step 706, a transfer amount is received. The amount may be a monetary amount or non-monetary amount. A monetary amount may be received as a dollar amount, while a non-monetary amount may be received including identifying information and a number of units. Identifying information may be SKUs in an inventory example and includes a number of units to be transferred.

At step 708, a holographic image is generated. The holographic image represents a visualization of the amount to be transferred and the transfer itself going from the source account to the destination account. In an example where the image is not a holographic image, the image generated may be a standard image generated on a computing device screen.

At step 710, the transfer amount is transferred to the recipient. This happens, for example, at the same time the holographic image shows the transfer occurring.

Figure 8:
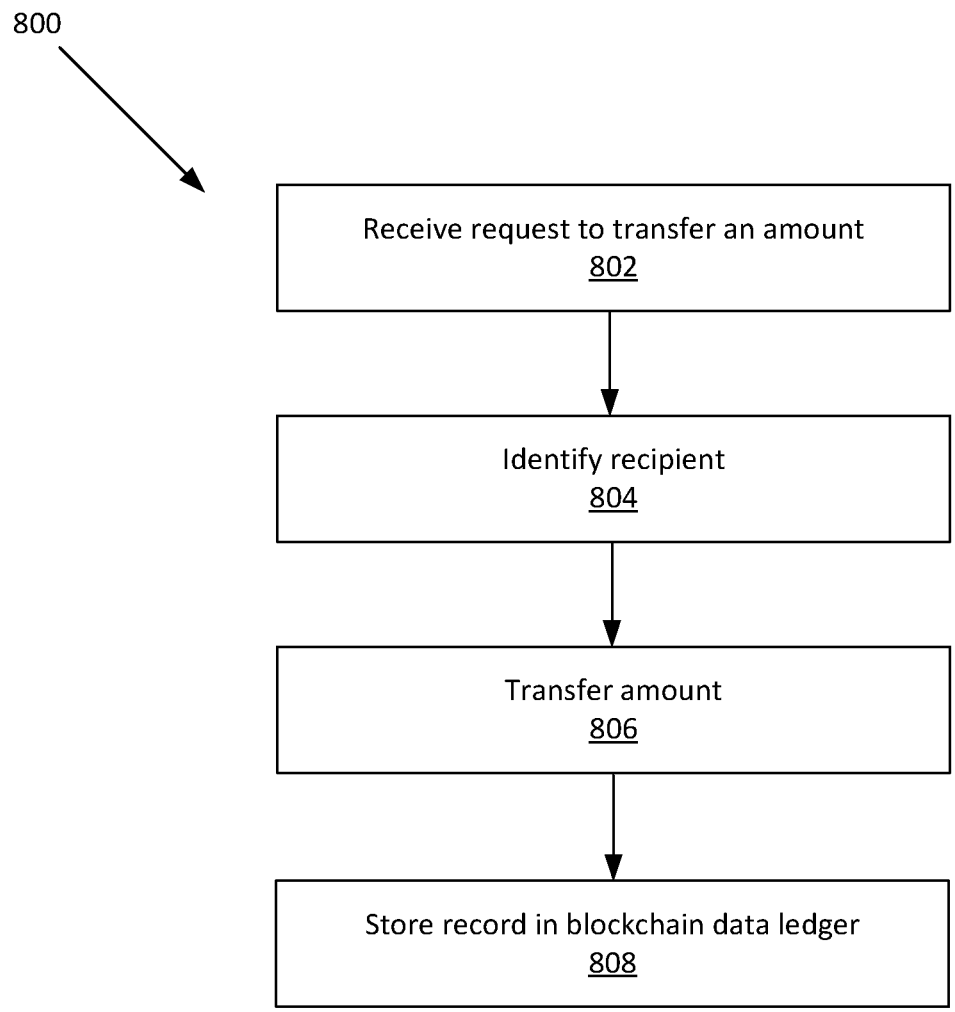
FIG. 8 illustrates an example method of transferring an asset amount.

FIG. 8 illustrates an example method 800 of transferring an asset amount from a source account to a destination account. At step 802, a request to transfer an amount of assets is received. The request also includes a source account.

At step 804, the destination account of the asset transfer is received. For example, the destination may be an individual recipient or may be a business. However, other destinations are possible.

At step 806, the asset amount is transferred from the source account to the destination account. A holographic image is generated for the user to visualize the transfer.

At step 808, a record is stored in a blockchain data ledger of at least the source account, amount transferred, and the destination account. Further, recorded information may include a date, a time, a beginning account balance of the source account, an ending account balance of the source account, a beginning account balance of the destination account, and an ending account balance of the destination account.

Figure 9:
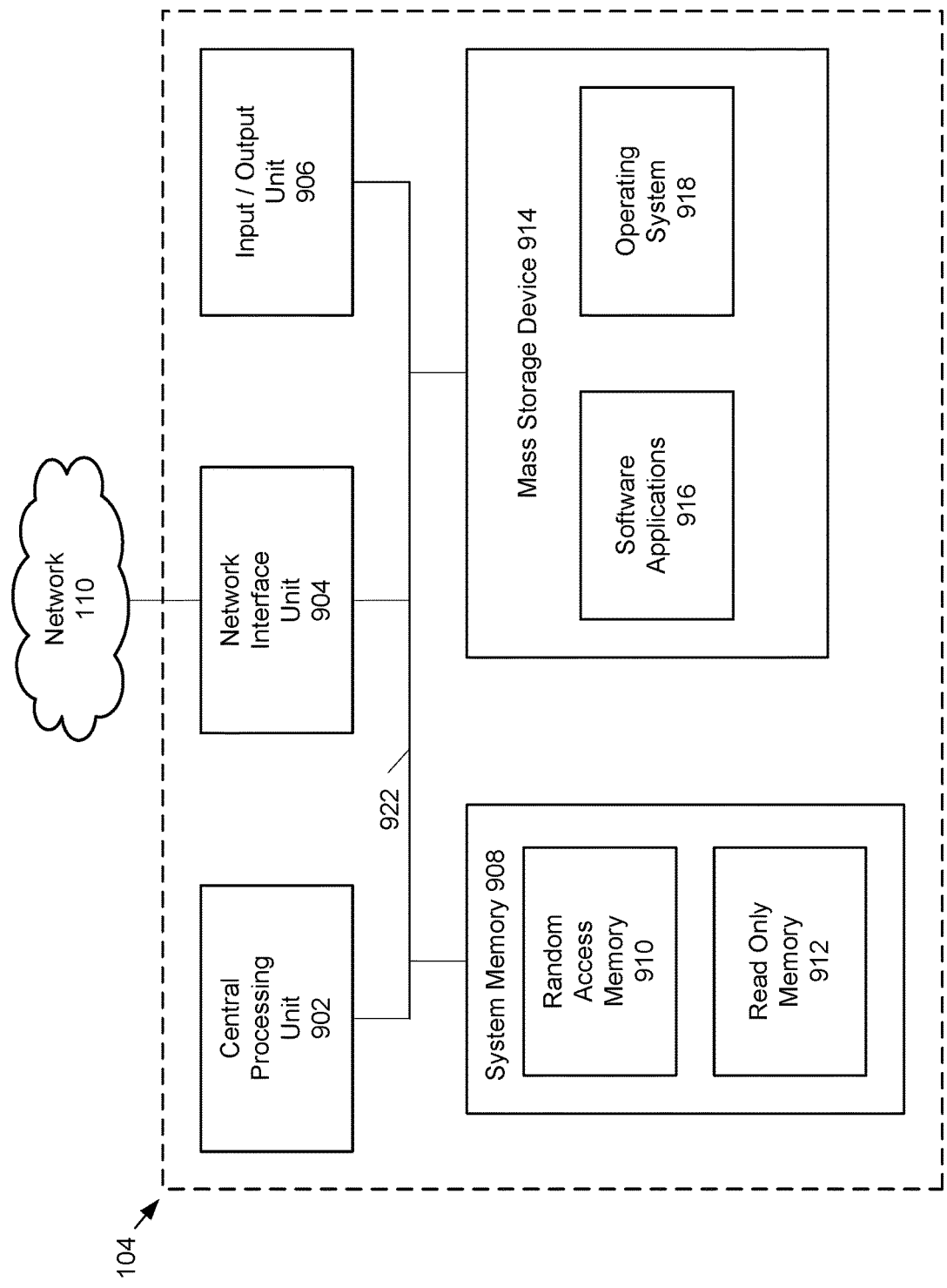
FIG. 9 illustrates example physical components of a server computing device.

As illustrated in FIG. 9, example physical components of the financial institution server device 104 are shown. Other computing devices (e.g., the computing device 106, the computing device 108, and the blockchain data storage device 120) can be configured in a similar manner.

The financial institution server device 104 includes at least one central processing unit ("CPU") 902, also referred to as a processor, a system memory 908, and a system bus 922 that couples the system memory 908 to the CPU 902. The system memory 908 includes a random access memory ("RAM") 910 and a read-only memory ("ROM") 912. A basic input/output system that contains the basic routines that help to transfer information between elements within the financial institution server device 104, such as during startup, is stored in the ROM 912. The financial institution server device 104 further includes a mass storage device 914. The mass storage device 914 is able to store software instructions and data.

The mass storage device 914 is connected to the CPU 902 through a mass storage controller (not shown) connected to the system bus 922. The mass storage device 914 and its associated computing device-readable data storage media provide non-volatile, non-transitory storage for the financial institution server device 104. Although the description of computing device-readable data storage media contained herein refers to a mass storage device, such as a hard disk or solid state disk, it should be appreciated by those skilled in the art that computing device-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program applications or other data. Example types of computer-readable data storage media include, but are not limited to, random access memory ("RAM"), read-only memory ("ROM"), erasable programmable read-only memory ("EPROM"), electrically erasable programmable read-only memory ("EEPROM"), flash memory or other solid state memory technology, compact disc read-only memory ("CD-ROMs"), digital versatile discs ("DVDs"), other optical storage media, magnetic cassettes, magnetic tape, magnetic disk storage or other magnetic storage devices, or any other medium which can be used to store the desired information and which can be accessed by the financial institution server device 104.

According to various embodiments, the financial institution server device 104 may operate in a networked environment using logical connections to remote network devices through the network 110, such as the Internet, or another type of network. The financial institution server device 104 may connect to the network 110 through a network interface unit 904 connected to the system bus 922. It should be appreciated that the network interface unit 904 may also be utilized to connect to other types of networks and remote computing systems. The financial institution server device 104 also includes an input/output controller 906 for receiving and processing input from a number of other devices, including a touch user interface display screen, or another type of input device. Similarly, the input/output controller 906 may provide output to a touch user interface display screen or other type of output device.

As mentioned briefly above, the mass storage device 914 and the RAM 910 of the financial institution server device 104 can store software instructions and data. The software instructions include an operating system 918 suitable for controlling the operation of the financial institution server device 104. The mass storage device 914 and/or the RAM 910 also store software instructions and software applications 916, that when executed by the CPU 902, cause the financial institution server device 104 to provide the functionality discussed in this document. For example, the mass storage device 914 and/or the RAM 910 can store software instructions that, when executed by the CPU 902, cause the financial institution server device 104 to route requests between existing application code and new application code.

The computing devices described herein result in the practical application of addressing shortages in payment amounts more efficiently. The computing devices are programmed to proactively identify such shortages, which results in the computing devices efficiently communicating such issues to customers and/or possibly addressing the issue automatically. This results in a system that functions independently and more quickly.

FIGS. 1-9 illustrate example systems and methods used to enable a user to visualize a transfer of assets, whether the assets are monetary, non-monetary, or a combination. A request for a transfer is received at an electronic computing device. The request includes, at least, a source account, a destination account, and a transfer amount. An image, such as a holographic image, representative of the transfer amount being transferred from the source account to the destination account is generated, and is sent to an image generator of the electronic computing device where it is displayed.

Embodiments of the present disclosure, for example, are described above with reference to block diagrams and/or operational illustrations of methods, systems, and computer program products. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the disclosure in any way. The embodiments, examples, and details provided in this application are considered sufficient to convey possession and enable others to make and use the disclosed embodiments. The disclosure should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the disclosure and the general inventive concept embodied in this application that do not depart from the broader scope.

What is claimed is:

1. A method for representing a visualization of assets, the method comprising:
   receiving a request for a transfer of assets from an electronic computing device having augmented reality (AR) capabilities or virtual reality (VR) capabilities, the request including a source account, a destination account, and a transfer amount;
   generating image data representative of the transfer amount being transferred from the source account to the destination account, wherein the image data is configured to be displayed as a holographic image, wherein the holographic image visually depicts the transfer amount moving from the source account to the destination account; and
   sending the image data to an image generator of the electronic computing device to be displayed as the holographic image in AR or VR by the electronic computing device.

2. The method of claim 1, wherein displaying the image data further comprises displaying an account balance of the source account.

3. The method of claim 2, wherein the account balance further comprises a denotation that a portion of the account balance is earmarked for a predetermined purpose.

4. The method of claim 2, wherein the account balance is displayed as a digital wallet, and wherein a size, a color, a pattern, an orientation, or a display text, is adjusted based on the account balance of the digital wallet.

5. The method of claim 1, wherein the assets are monetary assets.

6. The method of claim 1, wherein the assets are non-monetary assets selected from inventory, equipment, property, and intangible property.

7. The method of claim 1, further comprising storing a record in a blockchain ledger of the request for the transfer of assets.

8. The method of claim 1, further comprising sending the image data to an image generator of a destination account electronic computing device, the destination account electronic computing device being associated with the destination account.

9. The method of claim 1, wherein the request for the transfer of assets is set to occur at a future time, and, when the request occurs at the future time, a reminder is generated including a message that the transfer will occur at the future time.

10. The method of claim 9, further comprising generating an alert when the transfer occurs at the future time.

11. An electronic computing device comprising:
   at least one processor; and
   a system memory, the system memory including instructions, which, when executed by the processor, cause the electronic computing device to:
      receive a request for a transfer of assets from another electronic computing device having augmented reality (AR) capabilities or virtual reality (VR) capabilities, the request including a source account, a destination account, and a transfer amount;
      generate an image data representative of the transfer amount being transferred from the source account to the destination account, wherein the image data is configured to be displayed as a holographic image, wherein the holographic image visually depicts the transfer amount moving from the source account to the destination account; and
      send the image data to an image generator of the another electronic computing device to be displayed as the holographic image in AR or VR by the another electronic computing device.

12. The electronic computing device of claim 11, wherein the image data further comprises a display of an account balance and displaying at least a portion of the account balance that is earmarked for a predetermined purpose.

13. The electronic computing device of claim 11, wherein the instructions further cause the electronic computing device to:
   send the image data to a second image generator of a second electronic computing device, the second electronic computing device associated with the destination account.

14. The electronic computing device of claim 11, wherein the instructions further cause the electronic computing device to:
   receive the request for the transfer of assets, wherein the request is for the transfer of assets to occur at a future time; and
generate the image data comprising a reminder that the transfer will occur at the future time.

15. A method for visualizing a transfer of assets on an electronic computing device, the method comprising:
   receiving a request for a transfer of assets from the electronic computing device having augmented reality (AR) capabilities or virtual reality (VR) capabilities, the request including a source account, a destination account, and a transfer amount;
   sending the request to a server computing device;
   receiving, from the server computing device, an image data representative of the transfer amount, wherein the image data is configured to be displayed as a holographic image; and
   displaying, on an image generator of the electronic computing device, the image data depicting the transfer amount from the electronic computing device to a second electronic computing device associated with the destination account as the holographic image in AR or VR by the electronic computing device, wherein the holographic image visually depicts the transfer amount moving from the source account to the destination account.

16. The method of claim 15, wherein the request further comprises a request of a source account balance and further displaying the source account balance.

17. The method of claim 15, further comprising sending a record of the transfer to the server computing device, where the record of the transfer is stored in a blockchain ledger.

* * * * *